(12) United States Patent
Boers

(10) Patent No.: US 8,307,689 B2
(45) Date of Patent: Nov. 13, 2012

(54) DISCRETE DIE

(75) Inventor: Sebastiaan Henricus Alphons Boers, Eindhoven (NL)

(73) Assignee: Technische Universiteit Eindhoven, AZ Eindhoven (NL)

(*) Notice: Subject to any disclaimer, the term of this patent is extended or adjusted under 35 U.S.C. 154(b) by 925 days.

(21) Appl. No.: 12/307,347

(22) PCT Filed: Jun. 8, 2007

(86) PCT No.: PCT/NL2007/000143
§ 371 (c)(1),
(2), (4) Date: Feb. 9, 2009

(87) PCT Pub. No.: WO2008/004858
PCT Pub. Date: Jan. 10, 2008

(65) Prior Publication Data
US 2009/0308131 A1     Dec. 17, 2009

(30) Foreign Application Priority Data
Jul. 4, 2006  (NL) ...................... 1032111

(51) Int. Cl.
*B21D 17/02* (2006.01)
*B21D 37/02* (2006.01)
*B21B 25/00* (2006.01)
*B25B 5/16* (2006.01)

(52) U.S. Cl. ............ 72/384; 72/413; 72/465.1; 269/266

(58) Field of Classification Search .................. 72/357, 72/379.6, 384, 413, 462, 465.1, 473, 478, 72/481.1; 269/266, 43
See application file for complete search history.

(56) References Cited

U.S. PATENT DOCUMENTS
| | | | |
|---|---|---|---|
| 5,746,423 A * | 5/1998 | Arov ........................... | 269/266 |
| 6,053,026 A * | 4/2000 | Nardiello et al. ............... | 72/413 |
| 7,610,790 B2 * | 11/2009 | Halford ........................... | 72/413 |

FOREIGN PATENT DOCUMENTS
| | | |
|---|---|---|
| DE | 159905 | 4/1905 |
| DE | 203 20 712 U1 | 12/2004 |

OTHER PUBLICATIONS

Walczyk et al., "Development of a Reconfigurable Tool for Forming Aircraft Body Panels", Journal of Manufacturing Systems, Society of Manufacturing Engineers, vol. 17, No. 4, pp. 287-296, (1998).
Nakajima, "A Newly Developed Technique to Fabricate Complicated Dies and Electrodes With Wires", Bulletin of JSME, vol. 12, No. 54, pp. 1546-1554, (1969).

* cited by examiner

*Primary Examiner* — Teresa M Ekiert
(74) *Attorney, Agent, or Firm* — Barnes & Thornburg LLP

(57) ABSTRACT

A discrete die for forming a three-dimensionally curved surface. The discrete die includes a frame and parallel pins which are individually movable in a first longitudinal direction relative to the frame. The pins are arranged in parallel rows and front ends of the pins define the three-dimensionally curved surface. Further included are substantially plate-shaped separating elements and at least one of which is situated between the rows. Also included are pressure elements for pressing against the rows of pins and configured to push off against the frame in the radial direction of the pins. A surface of some of the plate-shaped separating elements extends parallel to the first longitudinal direction, the surface being corrugated in the second longitudinal direction, at least during use of the discrete die.

36 Claims, 5 Drawing Sheets

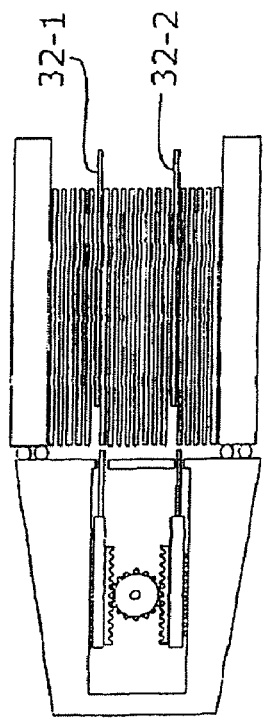
FIG. 5a
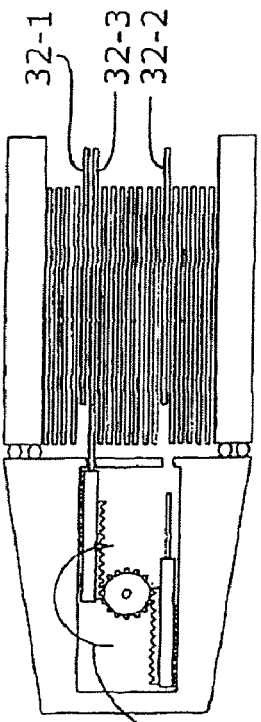
FIG. 5b
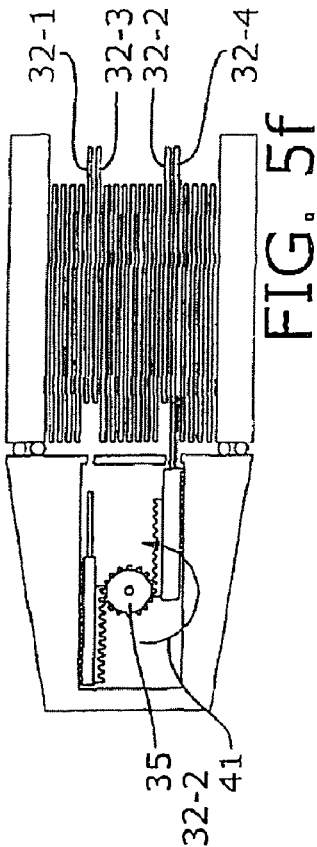
FIG. 5c
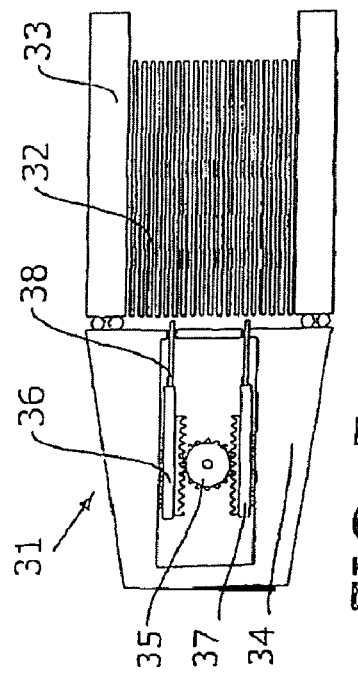
FIG. 5d
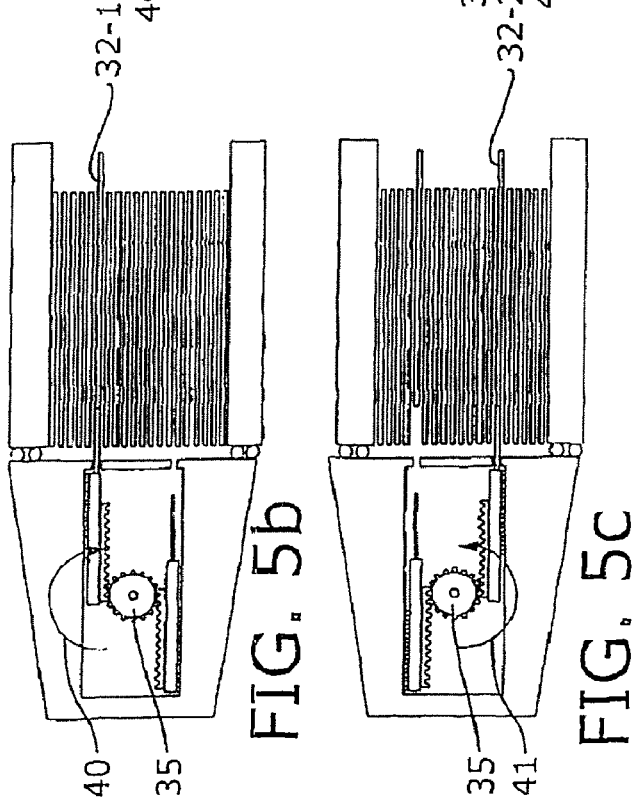
FIG. 5e
FIG. 5f

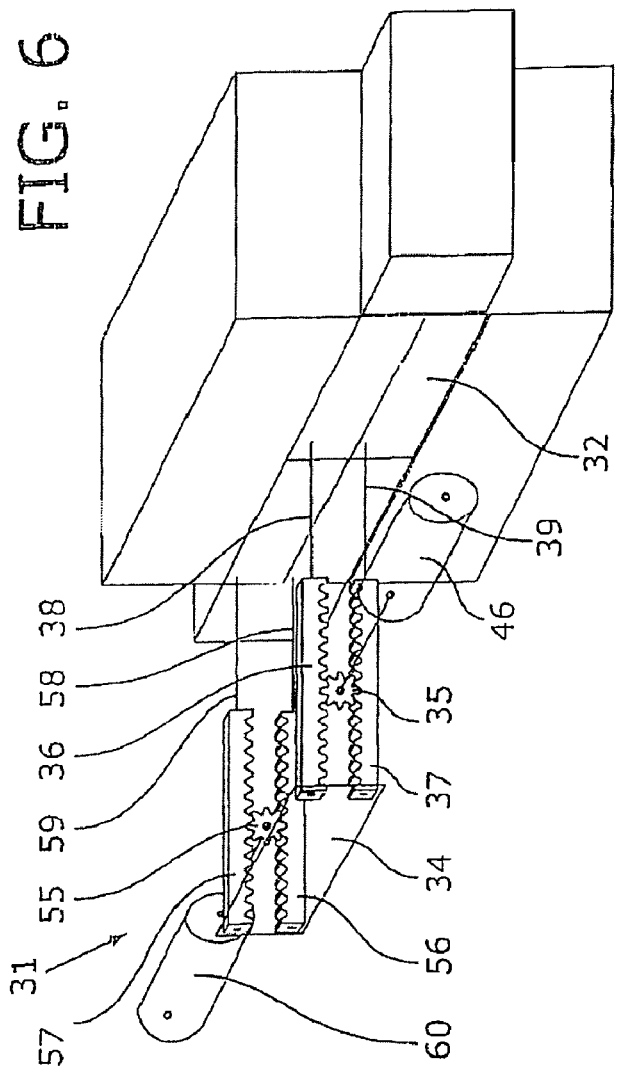
FIG. 6
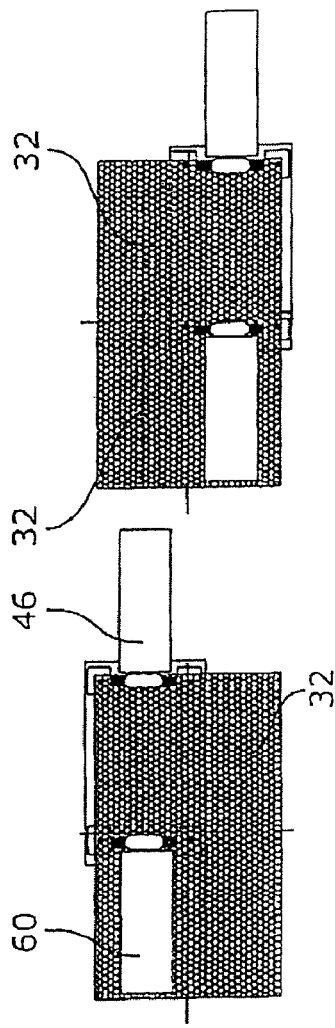
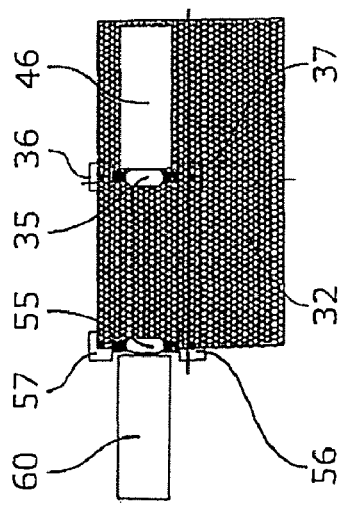
FIG. 7a  FIG. 7b  FIG. 7c

DISCRETE DIE

This is an application claiming priority to and benefit of U.S. National Stage Patent Application No. PCT/NL2007/000143, filed on Jun. 8, 2007 and Dutch Patent Application No. 1032111 filed Jul. 4, 20066 in The Netherlands, the subject matter of each being incorporated by reference herein.

BACKGROUND AND SUMMARY

The present invention relates to a discrete die for forming a three-dimensionally curved surface, comprising a frame, parallel pins which are individually movable in their longitudinal direction relative to the frame, which pins are arranged in parallel rows and whose front ends define said three-dimensionally curved surface, at least substantially plate-shaped separating elements between said rows, as well as pressure elements for pressing the rows of pins with the separating elements therebetween together whilst pushing off against the frame in the radial direction of the pins.

Such a discrete die is described in D. F. Walczyk, J. Lakshmikanthan, and D. R. Kirk, "Development of a reconfigurable tool for forming aircraft body panels.", Journal of Manufacturing systems, 17(4):287-296, 1998 with reference to FIG. 8 thereof. The known discrete die employs pins of square cross-section. An advantage of using separating elements is that in Walczyk the axial load-taking capacity of the pins, i.e. the maximum force that can be exerted on the pins in axial direction before an undesirable change in their longitudinal position occurs as a result of said axial force, is larger. The use of the substantially plate-shaped separating elements between the parallel rows of pins provides the additional advantage that it rules out the risk of a pin of an adjacent row being moved along with a pin that is being positioned in longitudinal direction on account of the frictional forces that would occur if there would not be a separating element. A significant drawback of the known discrete die is the fact that the pins are of square cross-section, which makes them relatively costly and which in practice also determines the minimum dimensions of the pins. This implies that the resolution of the three-dimensionally curved surface defined by the pins is limited. Furthermore, pins positioned adjacent to each other within a row still make contact with each other on their facing flat sides, so that there is still a risk of an adjacent pin in the same row moving along with a pin being positioned in longitudinal direction on account of the frictional forces between adjacent pins.

The aforesaid risk of pins moving adjacent pins in a discrete die along upon being moved to a desired longitudinal position is mentioned in direction on account of the frictional forces between adjacent pins is mentioned in N. Nakajima, "A newly developed technique to fabricate complicated dies and electrodes with wires.", Bulletin of JSME, 12(54):1546-1554, 1969, in which a discrete die is described whose pins are configured as steel wires having an average diameter of 1.81 mm or 5.40 mm, but in which no separating elements are used between rows of pins. Another drawback of the discrete die according to Nakajima is that there is no question of a homogeneous fixation force, because of the dimensional tolerances in the diameter of the pins ensuing from the fabrication process.

The object of the invention is to provide a discrete die as mentioned in the introduction, which in principle makes it possible to use (relatively inexpensive) round pins, without excluding the possibility within the framework of the present invention to use rectangular/square pins, which can be individually positioned in their longitudinal direction without concurrently influencing the longitudinal position of an adjacent pin on account of the frictional forces that occur, and whose axial load-taking capacity is more easily predictable. In order to accomplish that object, the present invention is characterised in that at least the surface extending parallel to the longitudinal direction of at least some of the plate-shaped separating elements is corrugated in the longitudinal direction of the rows, at least during use of the discrete die for producing a product. This creates the advantageous possibility to retain the pins in the valleys of the corrugations, as it were. Because of this there is no need for adjacent pins in a row to make contact with each other, or any such contact between adjacent pins will take place to a reduced extent, so that the risk of pins positioned adjacent to each other moving along with each other can be excluded or at least significantly reduced. An important additional advantage is the fact that because of the fact that the pins are retained in the valleys of the corrugations, it will be easier to position the pins correctly relative to each other upon fabrication of the discrete die, whilst furthermore the pins can be maintained in their correct position more easily during use of the discrete die, i.e. when at least some of the pins are subjected to an axial load. Moreover, the corrugated shape makes it possible to compensate dimensional variations of the pins due to tolerances in a relatively simple manner, because it can be ensured that the pins will abut against the separating elements.

Quite preferably, at least the surface extending parallel to the longitudinal direction of all the plate-shaped separating elements is corrugated in the longitudinal direction of the rows, at least during use of the discrete die for producing a product. Thus the pins can be positioned relatively close together, making it possible to further increase the pin density in the discrete die. Moreover, if all the plate-shaped separating elements have the same corrugated shape, which is preferable in the present preferred embodiments, this leads to a simpler construction of the discrete die.

According to a very important preferred embodiment, the separating elements, or at least the separating elements that have a corrugated surface, have a corrugated plane of symmetry. Based on a constant thickness of the separating elements, this implies that the separating elements as a whole may be regarded as being corrugated. In the present preferred embodiment a good, substantial enclosure of the pins is possible in combination with a high pin density.

Preferably, the corrugated shape of the separating elements has been obtained by plastic deformation of the separating elements. In practice this may for example be effected by passing a plate between two rolls, which rolls are provided with a toothed profile.

In order to carry out the positioning of the separating elements relative to each other in a correct and simple manner, the separating elements are preferably interconnected via a bridge element at at least one end thereof.

It is furthermore preferable in that connection if the bridge element and the separating elements are formed as one integral part, so that assembly of the separating elements to the bridge element is not necessary.

A suitable production technique for fabricating said integral part is wire sparking.

To achieve that the separating elements can move parallel to each other it is advantageous if each separating element is connected to the bridge element by means of at least one hinge, more preferably two hinges. The effect of using two hinges between each separating element and the bridge element may furthermore be that the orientation of the separating elements will not change upon movement of the separating elements.

To obtain a controlled transmission of forces, wherein the fixation force exerted on the pins by the separating elements is as homogeneous as possible, the separating elements and the pins are preferably so configured and dimensioned that there is contact between each pin and a separating element at two spaced contact positions.

From the viewpoint of equilibrium of forces it is furthermore preferable in that connection if the contact positions are provided in mirror symmetry with a plane of symmetry that extends perpendicularly to the associated separating element through the central axis of the associated pin.

Although it is quite possible within the framework of the present invention to configure each separating element as one piece of material, which will even be preferable in many cases, it may also be preferable in some cases if each separating element comprises a baseplate which is coated with an elastic material on at least one longitudinal side, more preferably on two opposite longitudinal sides. The elastic material functions to effect a correct abutment of the pins against the separating elements, whilst the baseplate provides the separating element with the required stiffness.

According to a very important preferred embodiment, the pins in a row are clear of each other. This excludes the risk of axial movement of one pin resulting in movement of an adjacent along therewith.

Furthermore it is quite preferable if the pins have a circular cross-section. Such pins are comparatively inexpensive to manufacture and may moreover have a relatively small diameter, which makes it possible to use a high pin density per unit area.

This latter effect is further enhanced if the pins of adjacent rows are staggered by a distance amounting to a half pitch relative to each other.

Especially when round pins are used, which are staggered by a distance amounting to a half pitch relative to each other in accordance with preferred embodiments discussed in the foregoing, it is preferable if the pitch between pins of a row equals the sum of the diameter of the pins and the thickness of the separating elements. In this way the pins may be oriented in such a manner that three pins positioned adjacent to each other form the corner points of an equilateral triangle.

Preferably, the corrugations are serrated in shape, since such a shape is relatively easy to produce.

In particular when corrugated separating elements according to a preferred embodiment of the invention as discussed above are used, it is preferable if the pins of adjacent rows are staggered relative to each other by a distance amounting to a half pitch. It is exactly then that the advantages as regards the enhanced fill ratio and resolution play a part.

The invention is in particular, but not exclusively, suitable for realising a discrete die that has a high pin density. Within this framework the diameter of the pins is preferably less than 1.3 mm. Furthermore preferably, the separating elements have a thickness of maximally 0.25 mm.

From the viewpoint of cost price it is preferable if the front ends of the pins are at least substantially flat.

To prevent the occurrence of a notch effect at the location of the circumferential edge of said at least substantially flat front end as much as possible, the circumferential edge in question is preferably bevelled.

A further improvement in this regard is achieved if the front ends of the pins are convex.

To produce products that are concave in shape, it may alternatively be advantageous, on the other hand, if the front ends of the pins are concave.

To distribute the pressure with which a pin is pressed against an object upon forming a product with the discrete die as uniformly as possible over the front surface of the pin, the pins are preferably provided with an elastic head, for example made of rubber, at their front ends. Said head may have a configuration similar to that of a matchstick, for example.

The elastic head preferably has an at least substantially rectangular cross-section, so that the elastic heads associated with all the pins can jointly form one closed elastic surface.

In order to obtain a uniform distribution of the forces between a product to be produced and the pins, an elastic mat is preferably provided on the front ends of the pins.

Quite preferably, the separating elements and/or the pins are plastically deformed locally in the areas where there is contact between the separating elements and the pins. The very important advantage that is thus obtained is that in this way a reliable, uniform abutment of the pins against adjacent plate-shaped separating elements can be ensured, whilst furthermore a uniform friction force is obtained between the pins and the plate-shaped separating elements during movement in longitudinal direction of the pins, since a homogeneous fixation force is used. Because of the local plastic deformation of the separating elements and/or the pins, much higher tolerances can be allowed as regards the dimensions (diameter) and the shape of the pins, since the differences in diameter of the pins are compensated by the plastic deformation, which plastic deformation must of course occur to an extent that equals the range of tolerances for the diameter and the shape of the pins. Within the framework of the present preferred embodiment it should be explicitly noted, for that matter, that the term diameter as used above not only relates to circular pins but also to pins having a square, a rectangular and/or other shape. In the case of the plastic deformation as described above it will be understood that it is in principle used only once, viz, before the discrete die is operated for producing products. The plastic deformation as described may also be used for compensating variations in the dimensions and the shape of the separating elements.

A correct abutment between the pins and the separating elements, also in the case of comparatively large tolerances as regards the dimension of the pins and/or the separating elements, can also be ensured if the deformation of the separating elements and/or the pins is of an elastic rather than a plastic nature. Said elastic deformation might in that case be imposed each time axial forces are exerted on the pins during the production of a product so as to thus create a homogeneous fixation force for the pins. Within this framework it is preferable if the material of the separating elements that is in contact with the pins and/or the material of the pins that is in contact with the separating elements is capable of undergoing an elastic elongation of at least 1%. In practice it will generally be preferred to use a combination of a comparatively hard and a comparatively soft material, for example a metal on the one hand and a plastic or a rubber on the other hand.

To make it possible to set the pins for forming a desired three-dimensionally curved surface in a simple manner, the rear ends of the pins positioned opposite the front ends are preferably free ends. Said positioning of the pins may in that case take place by pressing the pins against the rear ends, causing said pins to move an adjustable distance in the longitudinal direction.

The discrete die according to the invention is furthermore preferably provided with a setting device for individually positioning the pins at a desired longitudinal position so as to obtain a desired three-dimensionally curved surface defined by the front ends of the pins.

Such a setting device preferably comprises at least one elongated pressure element, pressure means for pressing said at least one pressure element against a pin end, as well as moving means for moving the pressure element past pin ends. It is explicitly noted in this connection that in principle the setting device may also press against the front ends of the pins, which eventually define the three-dimensionally curved surface, therefore. The use of moving means obviates the need to provide a separate driving arrangement for each pin and/or for each pressure element for pressing the pressure elements against the pin.

The settling device preferably comprises one setting unit to be moved by the moving means, which setting unit comprises a pair of pressure elements and a pair of racks, which racks are connected to the respective pressure elements and which engage a gear at different positions, as well as a driving element for imparting reciprocating motion to the gear such that the pressure elements are alternately pressed against a pin end. A setting device that is configured in this manner has the advantage that the setting device need not be moved for each pin separately but for each pair of pins, thus reducing the number of movements of the setting device by half. In addition, the use of a pair of racks with pressure elements connected thereto for each gear is advantageous from a viewpoint of mass inertia.

At least in order to increase the capacity it is advantageous if the setting device comprises two setting units at different position relative to the pins. Quite preferably, said setting units are each arranged for positioning a number of the pins simultaneously at the desired longitudinal position, with the driving elements associated with the two adjusting units simultaneously driving the associated gear in opposite directions. This, too, provides significant advantages as regards the mass inertia forces that occur, in which connection it should be realised that it is also possible when using the present preferred embodiment to move individual pins to the correct longitudinal position at a comparatively very high speed. In order to further increase the capacity it is possible within the framework of the present invention to configure the setting device with a number of pairs of setting units, each setting unit moving a predetermined number of the pins of the discrete die to the desired longitudinal position.

The discrete die according to the present invention may be used for various production techniques. Usually it will be preferable if the discrete die is designed for use in combination with a second die having a die surface that is directed towards the front ends of the pins associated with the discrete die. Said second die may be a discrete die, preferably a discrete die according to the invention, but it may also have a fixed die surface.

The present invention further relates to a method for producing products having a three-dimensionally curved surface, in which a discrete die according to the invention as explained above is used. Possible production techniques in which the discrete die can be used are the (injection) moulding process, or more specifically the so-called Polymer Injection Forming (PIF), or more specifically general deforming (a metal), explosion deforming and/or hydro-deforming.

The discrete die according to the present invention provides special possibilities, in particular during plastic deformation according to a preferred embodiment of a piece of material against the three-dimensionally curved surface.

Thus it is possible to change the three-dimensionally curved surface during the plastic deformation of the piece of material by changing the longitudinal position of at least a number of the pins. In this way the plastic deformation process can take place in a very controlled manner, so that eventually a product having improved material properties can be obtained.

The same advantage may apply if according to another preferred embodiment the piece of material is plastically deformed in successive steps, wherein a pressure force is exerted on the piece of material during each step for plastically deforming the piece of material to a limited extent, after which the force in question is decreased, wherein the three-dimensionally curved surface is changed between the various steps by changing the longitudinal position of at least a number of the pins.

Other aspects of the present disclosure will become apparent from the following descriptions when considered in conjunction with the accompanying drawings.

BRIEF DESCRIPTION OF THE DRAWINGS

FIGS. 5a-5f are schematic side views of a setting device that forms part of a discrete die according to the invention, showing six successive steps during the use thereof;

FIG. 6 is a schematic, isometric view of the setting device;

FIGS. 7a-7c are schematic rear views of the setting device, showing three successive stages during the use thereof;

DETAILED DESCRIPTION

Figure 1:
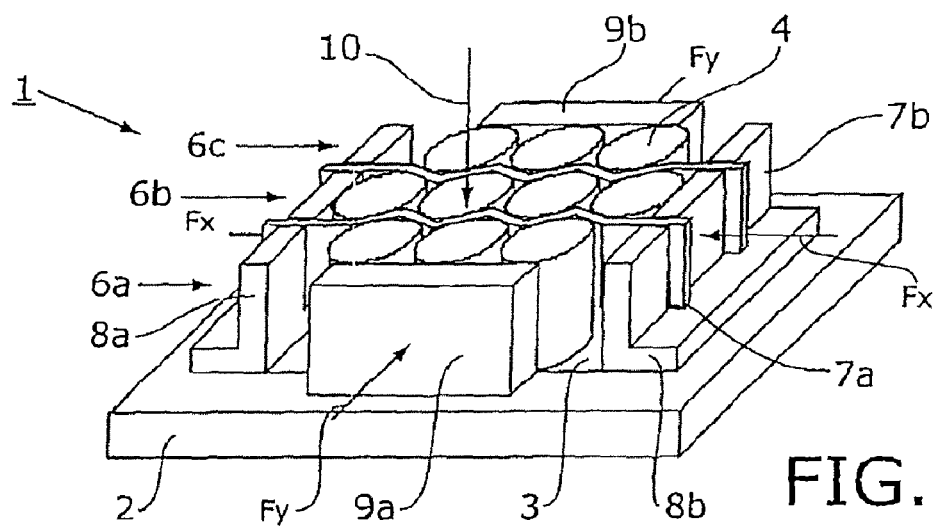
FIG. 1 is a schematic, isometric view of a discrete die according to the invention.

The discrete die 1 shown in FIG. 1 comprises a rectangular frame 2, with a rectangular opening 3 in the centre thereof. The discrete die 1 further comprises three (in this case) rows 6a, 6b, 6c of a number of identical pins 4. The pins 4 have a constant circular cross-section along their entire length.

Provided between the rows 6a, 6b and 6c are plate-shaped separating elements in the form of membrane elements 7a, 7b. The membrane elements 7a, 7b are corrugated, with the pins 4 of adjacent rows 6a, 6b, 6c being staggered by a half pitch relative to each other, so that they each fall into a valley of a corrugation. The pins 4 do not make direct contact with each other, not even the pins within a row 6a, 6b, 6c. The respective ends of the membrane elements 7a, 7b are attached to the opposing pressure elements 8a, 8b, which can be moved in a direction parallel to the X-direction with respect to the frame 2 by drive means (not shown). Pressure elements 9a, 9b are provided for pressing neighbouring rows 6a, 6b, 6c with the intermediate membrane elements 7a, 7b together (indicated Fy). When a force Fy is exerted, a force FX will have to be exerted as well so as to reach an equilibrium of forces. It can thus be derived that:

$$FX = \tfrac{1}{2} h 13 cy/cFy$$

wherein cy is the number of transitions between those pins in the y-direction that effect the force transmission in the Y-direction; and c is the number of transitions between those pins in the x-direction that effect the force transmission in the X-direction In this case the following is true: cy=2 and c,=6. Applying the above formula, this means that F=1/(313) F.

The use of the corrugated membrane elements 7a, 7b has significant advantages. In the first place said advantages become manifest upon movement of the individual pins 4 in the axial direction indicated by the arrow 10. Because there is no direct contact between the pins 4, there is no chance of a pin 4 moving along with an adjacent pin 4 that is being moved to the correct longitudinal position. The corrugated nature of the membrane elements 7a, 7b ensures that the pins 4 will not come into contact with each other. Once all the pins 4 have been set and the front ends of the pins 4 form a three-dimensionally curved surface, against which an object can be formed, there is furthermore a possibility of generating a sufficiently high degree of friction between the pins 4 on the one hand and the membrane elements 7a, 7b or the pressure elements 8a, 8b, 9a, and 9b on the other hand by exerting suitable forces Fx and Fy, so that the longitudinal position of the pins 4 can be ensured in spite of the existence of a relatively high load on the pin in the axial direction thereof when the product is being produced, for example when a metal plate is being plastically deformed.

To obtain a clamping force on the pins 4 that is the same for all the pins 4, irrespective of the position thereof within the discrete die, and taking into account the fact that the dimensions of the pins 4, in particular the diameter thereof, may not be the same for all pins because of tolerance variations, major advantages can be obtained if the membrane elements 7a, 7b and/or the pins 4 first undergo a limited amount of local plastic deformation at the location where they make contact with each other before the discrete die 1 is operated, so that the bearing pressure of the pins 4 on the membrane elements can be characterized as being the same for all the pins 4.

Figure 2:
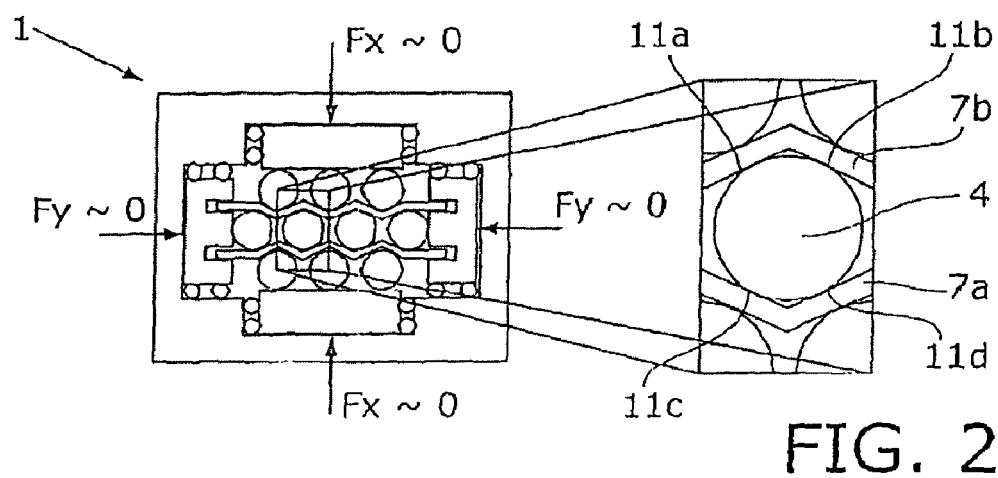
FIG. 2 is a view in Z-direction of the discrete die of FIG. 1 with membranes that have not plastically deformed yet, including a detail thereof.
Figure 3:
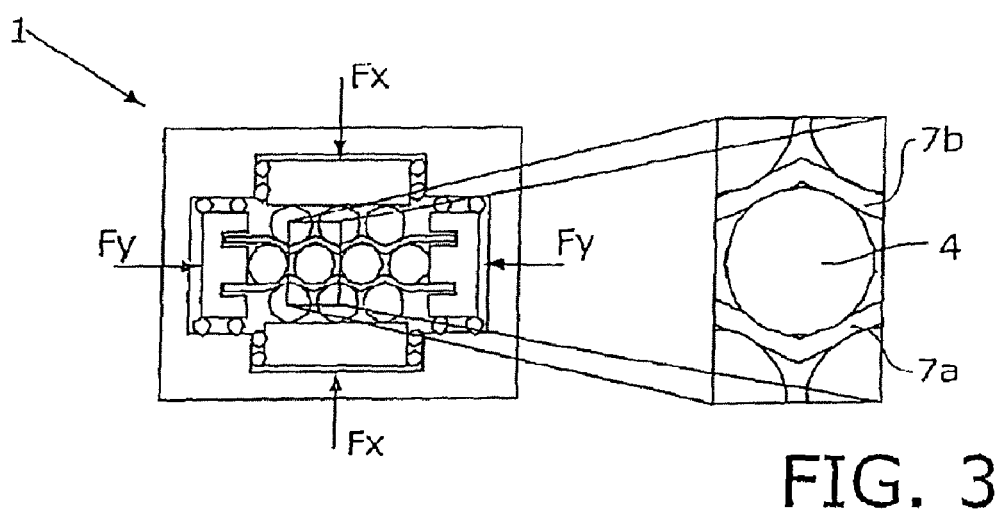
FIG. 3 is a view in Z-direction of the discrete die of FIG. 1 with membranes that have plastically deformed at the location where said membranes make contact with the pins, including a detail thereof.

In FIG. 2 the discrete die 1 is shown in the situation in which Fx and Fy approximately equal 0. The detail view of FIG. 2 clearly shows how each pin 4 just makes contact with the respective membrane elements 7a, 7b on four contact lines 11a, 11b, 11c, lid. In practice, however, a pin 4 may have a smaller diameter on account of production tolerances of the pins 4, so that in fact there is no contact between the membrane element 7a, 7b in question and the pin 4 at the location of one or a number of the contact lines 11a-lid. To ensure that such contact is nevertheless effected, it is very advantageous if, before the discrete die 1 is operated, forces Fx and Fy are exerted such that plastic deformation of the membrane elements 7a, 7b and/or the pins 4 ensues. This is shown in FIG. 3, assuming within this context that the membrane elements 7a, 7b are made of a soft material having a lower yield point than the pins 4. As a result, indentations extending the length of the pins 4 are formed in the membrane elements 7a, 7b at the location of the contact lines 11a-lid, which indentations have a radius equal to that of the pins 4. Said plastic deformation will continue to exist also after the forces Fx and Fy have been reduced to zero again. The degree of plastic deformation will partially depend on the actual diameters of the various pins 4. It is important in this connection that the forces FX and Fy be selected so that plastic deformation will occur to a certain extent at the location of each contact line 11a-11 d. Thus the shape of the membrane elements 7a, 7b, and in particular of the surface thereof, is optimally adapted to the actual shapes and dimensions of the pins 4, so that abutment of the pins 4 at the location of the four contact lines 11 a11 d (which in fact have become contact areas) is ensured and thus a readily controllable clamping force can be exerted on the pins 4 when the pins 4 are loaded in a longitudinal direction.

It is, incidentally, also conceivable to achieve the aforesaid advantages by realizing the deformation of the membranes 7a, 7b and/or the pins 4 in an elastic manner each time the pins are axially loaded in the longitudinal direction rather than by once-only plastic deformation thereof in advance. This preferred embodiment may be interesting in particular if use is made of membrane elements 7a, 7b and/or pins of plastic material or of membrane elements 7a, 7b and/or pins coated with a plastic material.

Figure 4:
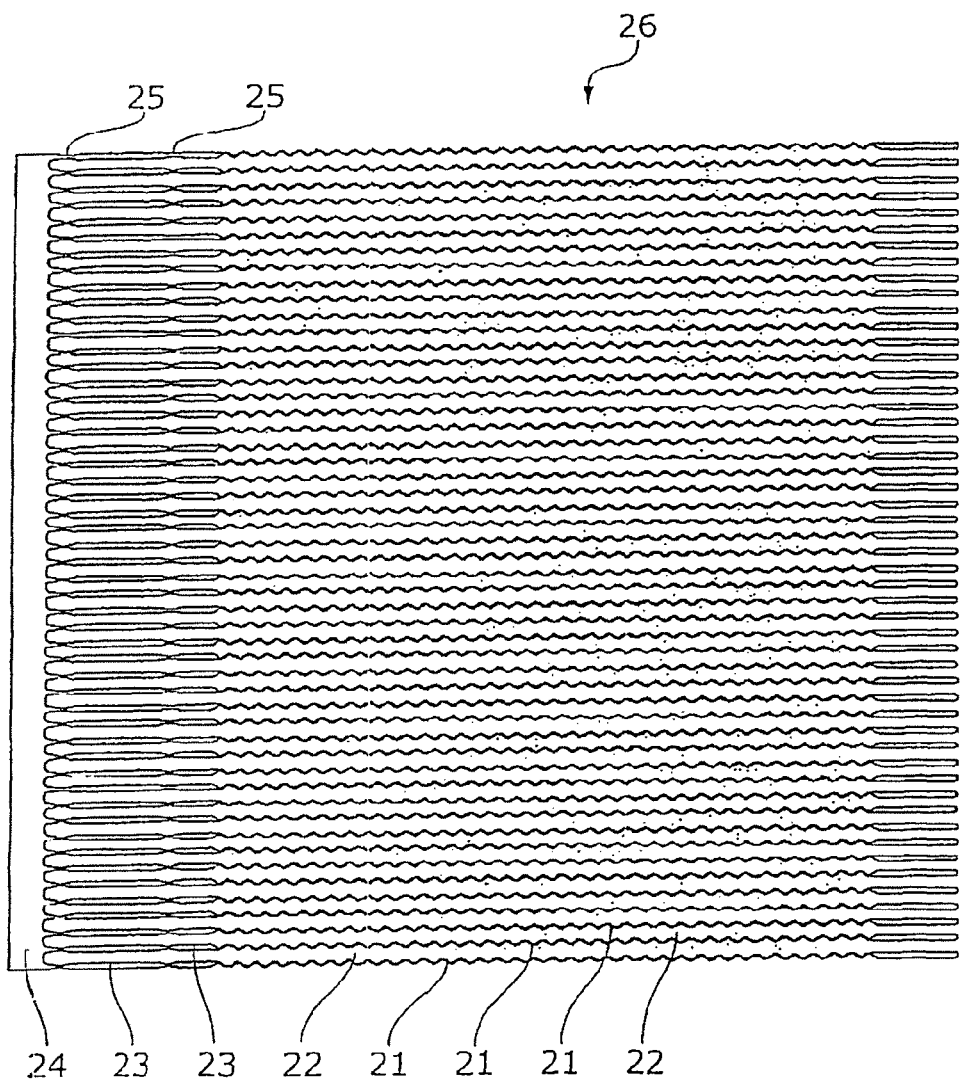
FIG. 4 is a plan view of a number of parallel membranes made of one piece of material, using a wire sparking technique.

FIG. 4 shows a membrane element device 26 comprising a plurality of parallel, corrugated membrane elements 21 comparable to the membrane elements 7a, 7b. Present between the membrane elements 21 are spaces 22 for rows of pins, such as the rows 6a-6c of pins 4. At one end the membrane elements 21 are connected to a bridge element 24 via a connecting element 23. The connecting elements 23 each comprise two film hinges 25, enabling the membrane elements 21 to move in a direction perpendicular to their longitudinal direction, with the film hinges 25 hinging in opposite directions to a limited extent. The membrane element device 26 comprising the bridge element 24, the connecting elements 23 and the membrane elements 21 has been formed of one block of metal by means of a wire sparking technique. This achieves that the membrane elements 21 will be correctly oriented relative to each other at all times and that pins can be easily moved into the spaces 22 provided for that purpose upon assembly of the associated discrete die.

FIGS. 5a-5f, 6 and 7a-7c relate to a setting device that may form part of the discrete die according to the invention, such as the discrete die 1. It is also possible to use the setting device with prior art discrete dies, providing the discrete die in question comprises pins that have a free end at one end. The setting device 31 is provided at the rear ends of pins 32 that form part of the discrete die according to the invention comprising a frame 33. The setting device 31 comprises a frame 34 which can be moved reciprocatingly both in vertical direction and in a direction perpendicular to the plane of drawing in FIGS. 5a-5f by moving means (not shown). A gear 35 is rotatable with respect to the frame 34 about the central axis that extends perpendicularly to the plane of drawing in FIG. 5a by means of the driving element 46. Two racks 36, 37 disposed on two opposite sides engage the gear 35, which racks can be moved forward and backward in horizontal direction as a result of rotation of the gear 35 effected by suitably controlling the driving element 46. At the ends facing towards the pins 32, pin-shaped pusher elements 38, 39 are connected to the racks 36, 37. The diameter of the pusher elements 38, 39 substantially corresponds to that of the pins 32.

Starting from the situation that is shown in FIG. 5a, in which none of the pins 32 have been moved to a desired longitudinal position yet by the setting device 31, the gear 35 is rotated to the right by the driving element 46 as indicated by the arrow 40 in FIG. 5b, causing the rack 36 with the pusher element 38 to move to the right, pushing one of the pins 32, viz, the pin 32-1, to the right so that the front end of the pin 32-1 will jut out. By subsequently rotating the gear 35 in the opposite direction as indicated by the arrow 41, the rack 36 will move back again, whilst the rack 37, which had been moved to the left in the step shown in FIG. 5b, is moved to the right until the pin 32-2 has been moved in its longitudinal direction to a desired extent by the pusher element 39. Then the gear 35 is returned to its original position shown in FIG. 5a, whereupon the frame 34 is moved downwards by the pitch distance between two pins 32, as is shown in FIG. 5d. FIGS. 5e and 5f subsequently show how the next two pins 32-3 and 32-4 can be moved to a desired longitudinal position by means of the setting device 31 in a similar manner as in FIGS. 5b and 5c.

FIG. 6 shows the setting device 31 in schematic isometric view. FIG. 6, and also FIGS. 7a-7c, show that the setting device 31 comprises a second set of a gear 55 and racks 56, 57 engaging said gear and, in line therewith, pin-shaped pusher elements 58, 59 directed towards the pins 32, which gear 55 is driven by a driving element 60. Like the gear 35, the gear 55 is rotatably journalled with respect to the frame 34, whilst the racks 56, 57 as well as the pusher elements 58, 59 are guided by guide means on the frame. The frame 34 is only shown very schematically in FIG. 6. To prevent misunderstanding it is noted that the illustration of FIG. 6 is by no means intended to suggest that the ends of the racks 36, 37, 56, 57 remote from the pins 32 are rigidly connected to the frame 34. What is intended, however, is to show that the two gears 35, 55 and the associated racks 36, 37, 56, 57 and the driving elements 46, 60 are only capable of joint movement in a plane perpendicular to the longitudinal direction of the pins 32.

The control means (not shown), which, as those skilled in the art will appreciate, control the driving elements 46, 60 in such a manner that a desired three-dimensional surface is formed at the front ends of the pins 32, consistently drive the driving elements 46, 60 in opposite directions, so that the setting device 31 will exhibit a stable behaviour also at high speeds. In fact the pins 32 are divided into four quadrants, and the pins 32 of each quadrant are moved to the correct longitudinal position by one and the same pusher element 38, 39, 58, 59. As soon as all the pins 32 of two rows have been moved to a desired longitudinal position by the setting device 31, as explained with reference to FIGS. 5a-5f, the setting device, or more specifically the frame 34 with all the components connected thereto, will be moved perpendicularly to the plane of drawing of FIGS. 5a-5f over a distance corresponding to the distance between two rows of pins 32 so as to move the pins 32 of a next row to the correct required position.

Figure 8A:
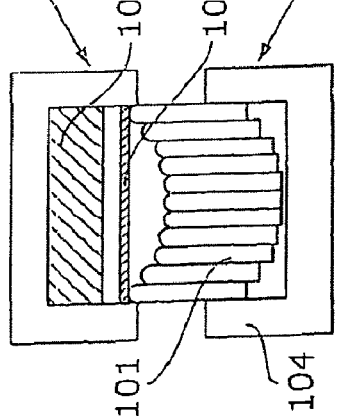
FIGS. 8a and 8b show two successive steps during a first application of a discrete die according to the invention, with FIG. 8c showing the final product.

FIGS. 8a-10c show three applications of a discrete die according to the invention. The discrete die 101 in FIGS. 8a and 8b is used for plastically deforming a metal plate 102. The discrete by 101 forms part of a fixed die member 103 comprising a die holder 104, which can be regarded as a frame for a discrete die 101. In addition to that, a movable die member 105 comprising a rectangular rubber cushion 106 is used, which deforms in conformity to the free surface of the discrete die 101 when the movable die member is moved towards the fixed die member 103, as shown in FIG. 8b.

Figure 9A:
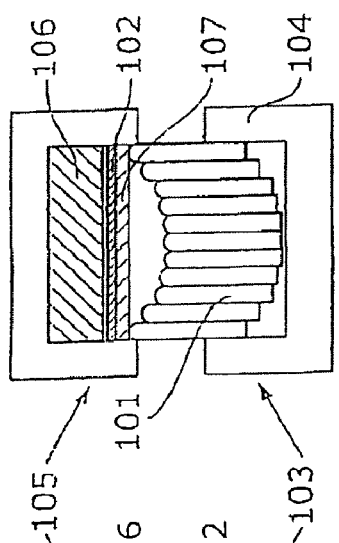
FIGS. 9a and 9b show two successive steps during a first application of a discrete die according to the invention, with FIG. 9c showing the final product.
Figure 9B:
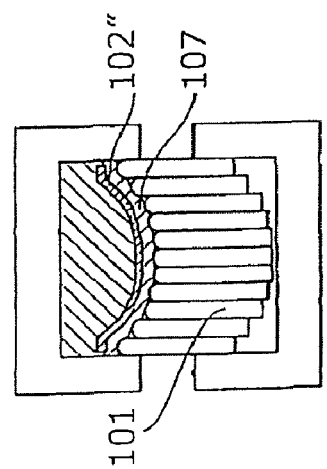
Figure 9C:
Figure 8B:
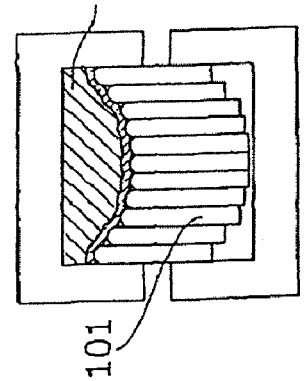
Figure 8C:
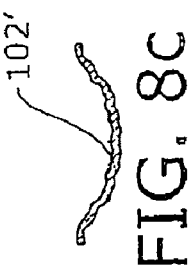

As FIGS. 8a and 8b show, the upper ends of the pins of the discrete die 101 are rounded. As a result, the obtained metal plate 102' will look slightly wrinkled. This phenomenon can be reduced significantly by using an interpolator, for example in the form of a rubber mat 107, between the metal plate 102 and the discrete die 101 (FIGS. 9a-9c). The product 102" that is thus obtained has a significantly less wrinkled surface, partially depending on the thickness and the nature of the material of the interpolator 107.

Instead of using a rubber die member 106 it is of course also possible within the framework of the present invention to use a fixed die having a surface that corresponds to that of the discrete die 101, or a second discrete die.

Figure 10A:
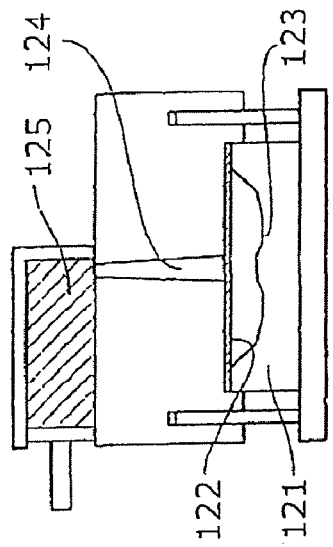
FIGS. 10a and 10b show two successive steps during a first application of a discrete die according to the invention, with FIG. 10c showing the final product.
Figure 10B:
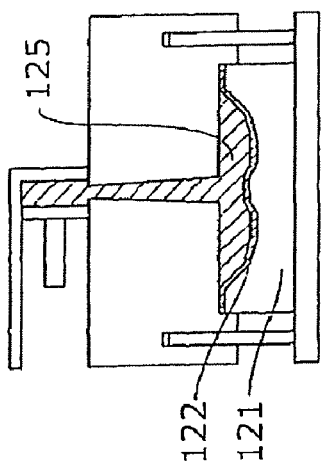
Figure 10C:
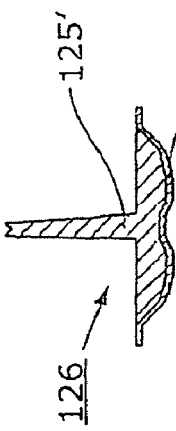

FIGS. 10a, 10b and 10c relate to the use of a discrete die 121, the individual pins of which cannot be distinguished in FIGS. 10a and 10b for that matter, in the so-called polymer injection forming process. A flat metal plate 122 is placed on a die 121 whose pins define a concave three-dimensional surface 123. Then a plastic melt 125 supplied under pressure via a supply channel 124 is pressed against the upper side of the metal plate 122, as a result of which said metal sheet 122 will plastically deform to conform to the shape of the three-dimensional surface 123. Simultaneously therewith, the plastic melt 125 will solidify, with the solidified plastic material 125 and the plate 122 bonding together, thus forming the product 126.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A discrete die for forming a three-dimensionally curved surface, the discrete die comprising:
   a frame;
   a plurality of pins that are individually movable in a first longitudinal direction relative to the frame, the plurality of pins being arranged in parallel rows having a second longitudinal direction, and front ends of the plurality of pins define the three-dimensionally curved surface;
   a plurality of substantially plate-shaped separating elements, and at least one of the plurality of substantially plate-shaped separating elements is situated between the rows;
   a plurality of pressure elements located on the frame for pressing against the rows of pins and configured to push against the frame in a radial direction of the rows of pins; and
   wherein a surface of some of the plurality of the plate-shaped separating elements extends parallel to the first longitudinal direction, the surface being corrugated in the second longitudinal direction, at least during use of the discrete die.

2. The discrete die according to claim 1, wherein the surface of each of the plurality of substantially plate-shaped separating elements is corrugated in the second longitudinal direction.

3. The discrete die according to claim 1, wherein the separating elements have a corrugated plane of symmetry.

4. The discrete die according to claim 3, wherein the corrugated shape of the separating elements is obtained by plastic deformation of the separating elements.

5. The discrete die according to claim 1, wherein the separating elements are interconnected via a bridge element at at least one end.

6. The discrete die according to claim 5, wherein the bridge element and the separating elements are formed as one integral part.

7. The discrete die according to claim 6, wherein the said integral part is fabricated by wire sparking.

8. The discrete die according to claim 5, wherein each separating element is connected to the bridge element at least one hinge.

9. The discrete die according to claim 1, wherein the separating elements and the pins are configured and dimensioned such that there is contact between each pin and one of the separating elements at two spaced-apart contact positions.

10. The discrete die according to claim 9, wherein the contact positions are provided in mirror symmetry with a plane of symmetry that extends perpendicularly to an associated separating element through a central axis of an associated pin.

11. The discrete die according to claim 1, wherein each of the separating elements comprises a baseplate which is coated with an elastic material on at least one longitudinal side.

12. The discrete die according to claim 1, wherein each of the plurality of pins in each of the rows are clear of each other.

13. The discrete die according to claim 1, wherein the plurality of pins each have a circular cross-section.

14. The discrete die according to claim 1, wherein the plurality of pins located in adjacent rows are staggered relative to each other by a distance amounting to a half pitch.

15. The discrete die according to claim 1, wherein a pitch between pins in a row one of the rows equals a sum of the diameter of one of the pins and a thickness of one of the separating elements.

16. The discrete die according to claim 1, wherein the corrugated surface is serrated in shape.

17. The discrete die according to claim 1, wherein a diameter of each of the pins is less than 1.3 mm but greater than zero.

18. The discrete die according to claim 1, wherein the front ends of the pins are substantially flat.

19. The discrete die according to claim 18, wherein a circumferential edge of the substantially flat front ends is bevelled.

20. The discrete die according to claim 1, wherein each of the front ends is convex.

21. The discrete die according to claim 1, wherein each of the front ends is concave.

22. The discrete die according to claim 1, wherein the pins include an elastic head at the front ends.

23. The discrete die according to claim 22, wherein the elastic head has a substantially rectangular cross-section.

24. The discrete die according to claim 1, wherein an elastic mat is provided on the front ends of the pins.

25. The discrete die according to claim 1, wherein one or both of the separating elements and the pins are plastically deformed locally in areas where there is contact between the separating elements and the pins.

26. The discrete die according to claim 1, wherein a material of the separating elements that is in contact with the pins is configured to be elastically elongated by at least 1%.

27. The discrete die according to claim 1, wherein rear ends of the pins are positioned opposite the front ends and are free ends.

28. The discrete die according to claim 1, further comprising a setting device provided for individually positioning the pins at a desired longitudinal position so as to obtain a desired three-dimensionally curved surface defined by the front ends of the pins.

29. The discrete die according to claim 28, wherein the setting device comprises at least one elongated pressure element, pressure means for pressing the at least one pressure element against an end of the pins and moving means for moving the pressure element past the ends of the pins.

30. The discrete die according to claim 29, wherein the setting device further comprises at least one setting unit configured to be moved by the moving means, which at least one setting unit comprises a pair of pressure elements and a pair of racks, which racks are connected to one of the respective pressure elements and which engage a gear at different positions, and a driving element for imparting reciprocating motion to a gear such that the pressure elements are alternately pressed against one of the ends of the pins.

31. The discrete die according to claim 30, wherein the at least one setting device comprises two setting units at different positions relative to the pins, which two setting units are each arranged for positioning a number of the pins simultaneously at the desired longitudinal position, and the driving elements associated with the two adjusting units simultaneously drive the associated gear in opposite directions.

32. The discrete die according to claim 1, wherein the discrete die is configured to be used in combination with a second discrete die having a die surface directed towards the front ends of the pins of the discrete die.

33. A method for producing a product having a three-dimensionally curved surface, the method comprising the step of providing the discrete die according to claim 1.

34. The method according to claim 33, further comprising the step of plastically deforming a piece of material against the three-dimensionally curved surface.

35. The method according to claim 34, further comprising the step of changing the three-dimensionally curved surface during the plastic deformation of the piece of material by changing a longitudinal position of at least a number of the plurality of pins.

36. The method according to claim 34, further comprising the step of plastically deforming the piece of material in successive steps, wherein a pressure force is exerted on the piece of material during each step for plastically deforming the piece of material to a limited extent, after which the pressure force is decreased, and further wherein the three-dimensionally curved surface is changed between steps by changing the longitudinal position of at least a number of the plurality of pins.

* * * * *